US009218641B1

(12) United States Patent
Ellis

(10) Patent No.: US 9,218,641 B1
(45) Date of Patent: Dec. 22, 2015

(54) ALGORITHM FOR CALCULATING HIGH ACCURACY IMAGE SLOPES

(75) Inventor: Kenneth K. Ellis, Columbia City, IN (US)

(73) Assignee: Exelis, Inc., Herndon, VA (US)

( * ) Notice: Subject to any disclaimer, the term of this patent is extended or adjusted under 35 U.S.C. 154(b) by 657 days.

(21) Appl. No.: 13/526,799

(22) Filed: Jun. 19, 2012

(51) Int. Cl.
*H04N 7/18* (2006.01)
*G06T 3/00* (2006.01)
*G06T 3/40* (2006.01)
*H04N 7/00* (2011.01)
*G01C 11/02* (2006.01)

(52) U.S. Cl.
CPC ............ *G06T 3/005* (2013.01); *G01C 11/02* (2013.01); *G01C 11/025* (2013.01); *G06T 3/4007* (2013.01); *H04N 7/005* (2013.01)

(58) Field of Classification Search
CPC ................................. G06K 9/38; G06T 3/005
USPC ............................................ 382/181; 348/144
See application file for complete search history.

(56) References Cited

U.S. PATENT DOCUMENTS

| | | | | |
|---|---|---|---|---|
| 5,123,085 A * | 6/1992 | Wells et al. | | 345/421 |
| 5,550,937 A * | 8/1996 | Bell et al. | | 382/293 |
| 6,084,989 A * | 7/2000 | Eppler | | 382/293 |
| 7,212,670 B1 * | 5/2007 | Rousselle et al. | | 382/173 |
| 7,733,961 B2 * | 6/2010 | O'Hara et al. | | 375/240.19 |
| 8,199,985 B2 * | 6/2012 | Jakobsson et al. | | 382/128 |
| 8,577,184 B2 * | 11/2013 | Young | | 382/299 |
| 8,666,196 B2 * | 3/2014 | Young | | 382/299 |
| 8,922,654 B2 * | 12/2014 | Ellis | | 348/144 |
| 2003/0081836 A1 * | 5/2003 | Averbuch et al. | | 382/199 |
| 2005/0013486 A1 * | 1/2005 | Wiedemann et al. | | 382/181 |
| 2014/0111511 A1 * | 4/2014 | Raif | | 345/420 |

OTHER PUBLICATIONS

Cubic Convolution Interpolation for Digital Image Processing (Robert Keys).*
Understanding the DaVinci Resizer (Xiangdong Fu).*
Digital Signal Processing and sin(x)/x (Markus Kuhn).*
Understanding the DaVinci Resizer (Xiangdong Fu); SPRAAI7B-Jul. 2008.*
Cubic Convolution Interpolation for DSP (Robert G. Keys); Dec. 1981.*
Digital Signal Processing (Markus Kuhn); Michaelmas 2009.*
Ellis, Kenneth; "Algorithm for Adaptive Downsampling to an Irregular Grid;" U.S. Appl. No. 13/427,051, filed Mar. 22, 2012.

* cited by examiner

*Primary Examiner* — William C Vaughn, Jr.
*Assistant Examiner* — Luis Perez Fuentes
(74) *Attorney, Agent, or Firm* — RatnerPrestia

(57) ABSTRACT

A method of determining slope of pixel intensities in an image includes the following steps: (a) receiving, from an imaging device, input pixel samples of a region of interest; (b) forming an impulse response function (IPR) for use in resampling the input pixel samples into output pixel intensities; and (c) calculating a derivative of the IPR. Also included is the step of convolving the derivative of the IPR with the input pixel samples to determine the slope of the output pixel intensities in the region of interest. In addition, the input pixel samples are generated in a first coordinate system by the imaging device, and the output pixel intensities are generated in a second coordinate system.

17 Claims, 7 Drawing Sheets

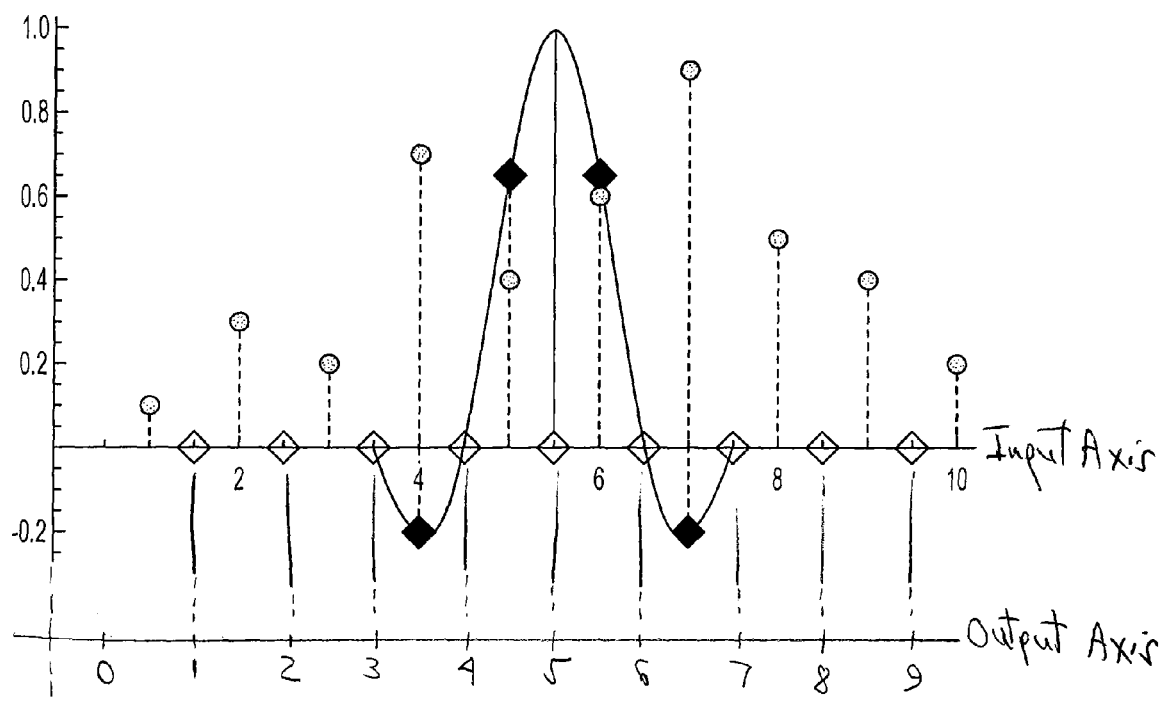

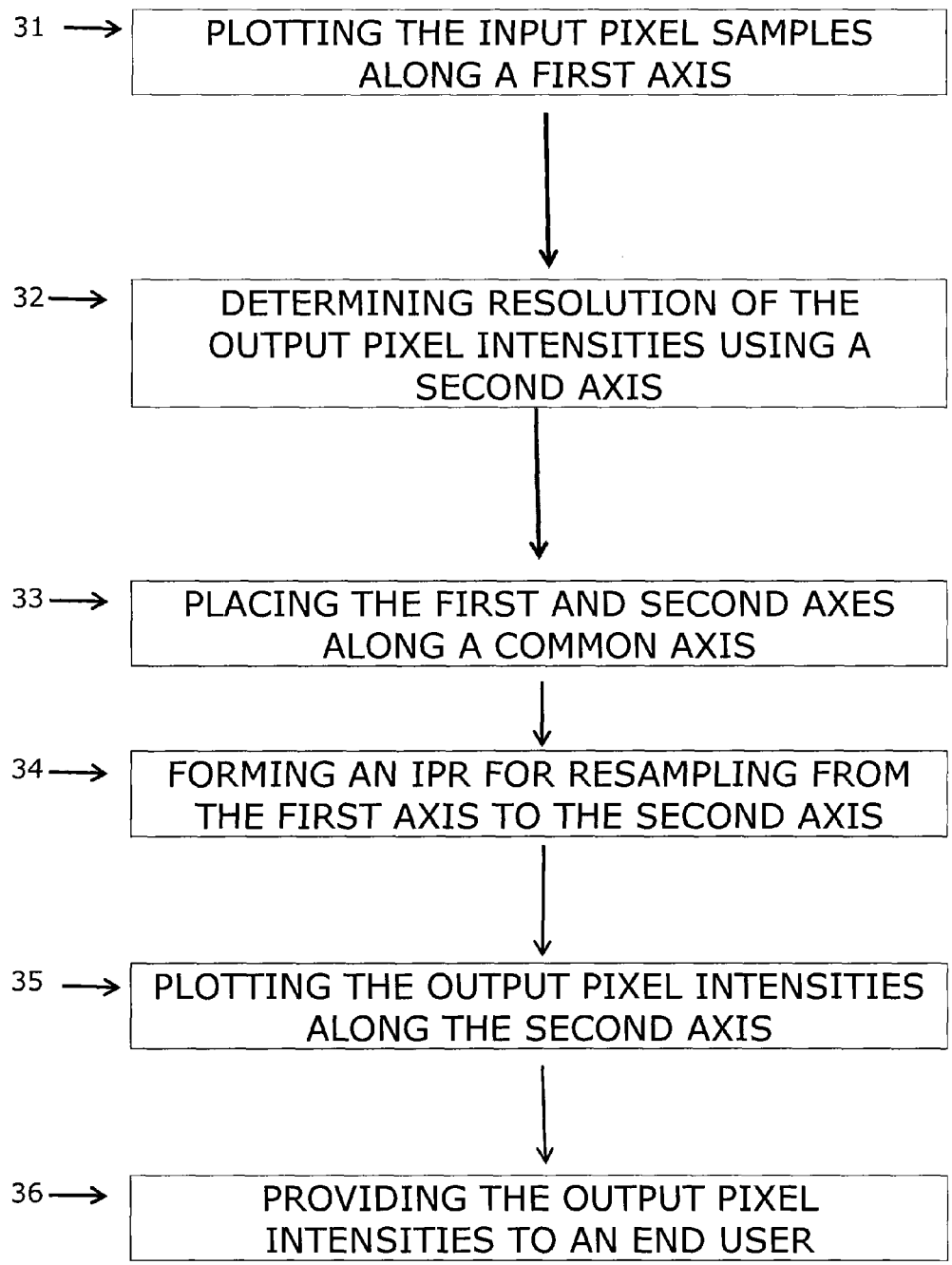

ALGORITHM FOR CALCULATING HIGH ACCURACY IMAGE SLOPES

STATEMENT REGARDING FEDERALLY SPONSORED RESEARCH

This invention was made under Contract No. NNG04HZ07C and the United States Government may have certain rights in this invention.

FIELD OF THE INVENTION

The present invention relates, in general, to calculating a slope in a group of pixels of an image. More specifically, the present invention relates to calculating a slope in a group of pixels of an image, as the image is collected in one grid system and resampled into another grid system. Stated differently, the present invention provides a system and method for simultaneously resampling and differentiating (calculating a slope of) a group of pixels in an image.

BACKGROUND OF THE INVENTION

It is often desirable to take repeated images of the Earth such that each image pixel is located at the exact same location on the Earth's surface. However, it is not possible to collect multiple images from the same exact location with the same exact pointing angle. Resampling solves this problem by interpolating data samples from the original collection grid, which changes from image to image, to a grid that is fixed with respect to the Earth's surface. There are many other applications where resampling is used to determine signal values at desired locations that are different from those at which the data is collected.

Imaging systems collect pixels on a collection grid that has approximately uniform angular spacing in the instrument's coordinate system. In many applications, it is desirable to map these pixels to a uniform geo-centric angular grid, such as latitude-longitude. The function that maps the collection sample grid to the Earth's surface may be nonlinear. Accordingly, a uniform grid on the Earth's surface may map to a non-uniform grid in the instrument's coordinate system, and a uniform grid in the instrument's coordinate system may map to a non-uniform grid on the Earth's surface.

It will be appreciated that downsampling is a special case of resampling. For example, downsampling by a factor of two is a reduced resampling by a factor of two.

Images consist of samples of scene intensities (i.e. pixels). There are many applications in which one needs to calculate the spatial derivative of the scene intensities. Typically this is done by calculating a discrete derivative. The discrete derivative is calculated by subtracting values of adjacent pixels, which effectively provides an approximation of the derivative at points midway between pairs of pixels. It may also be calculated by subtracting values of non-adjacent pixels, providing an even poorer approximation to the derivative at points midway between pairs of pixels.

When the scene intensity changes slowly, there may be many pixels which sample the scene changes. In such a case, a discrete derivative may be a good approximation to the true derivative. When the scene intensity changes rapidly, however, there may only be two or three pixels that can sample the intensity changes. When this occurs the discrete derivative is a very poor approximation to the true derivative. It will be appreciated that rapid intensity changes occur frequently at edges of an object being imaged.

A discrete derivative could be made more accurate by interpolating the data at a high resolution and then calculating adjacent sample differences. However, this significantly increases the computational load on the processing hardware. It also requires a careful design of the interpolator, since interpolating also introduces image quality degradation and subsequent errors.

Discrete derivatives also have one other shortcoming. They can only be calculated at locations midway between pixels. One may calculate the discrete derivative at a pixel location by calculating the differences between the pixels on either side of the pixel of interest, but this introduces a larger error in the value of the derivative. In addition, there are many applications where images are remapped from a collection grid to a more desirable output grid, making it desirable to be able to calculate derivatives at arbitrary locations between pixels.

As will be explained, the present invention takes advantage of the fact that images are often collected in one grid system and then resampled to a more desirable grid system. The present invention uses this resampling to produce highly accurate values of derivatives of scene intensities. As will also be explained, the present invention advantageously produces very accurate derivatives (or slopes) of scene intensities at arbitrary pixel locations.

SUMMARY OF THE INVENTION

To meet this and other needs, and in view of its purposes, the present invention provides a method of determining slope of pixel intensities in an image. The method includes the steps of: (a) receiving, from an imaging device, input pixel samples of a region of interest; (b) forming an impulse response function (IPR) for use in resampling the input pixel samples into output pixel intensities; (c) calculating a derivative of the IPR; and (d) convolving the derivative of the IPR with the input pixel samples to determine the slope of the output pixel intensities in the region of interest.

The input pixel samples may be generated in a first coordinate system by the imaging device, and the output pixel intensities may be generated in a second coordinate system. The input pixel samples may be formed along a first axis in a first coordinate system, and the output pixel intensities may be formed along a second axis in a second coordinate system.

The step of convolving includes the following sub-steps: (i) placing the first axis and the second axis along a common axis; (ii) centering the derivative of the IPR at a point along the second axis; (iii) obtaining samples of the derivative of the IPR at points along the first axis; (iv) multiplying each sample of the derivative of the IPR by a corresponding input pixel sample at corresponding points along the first axis; and (v) summing results of the multiplying step.

The step of convolving may be defined by the following equation:

$$s'(x) = r'(x) \otimes h(x) \otimes u(x)$$

where
 s(x) is the output pixel intensities in the region of interest,
 s'(x) is the slope of the output pixel intensities in the region of interest,
 h(x) is an impulse response of the imaging device,
 u(x) is scene intensity,
 r(x) is the resampler IPR,
 r'(x) is the derivative of the resampler IPR.

The region of interest may be an edge in the image. The edge may include at least one of a geographic feature, a pattern in a database of patterns, or a segment of an image. The region of interest may be a knife-edge target in the image, in which the knife-edge target is used for calculating an optical transfer function (OTF) of the image.

Another embodiment of the present invention is a method of determining slope of a region of interest in an image. The method includes the steps of: (a) receiving input pixel samples of the region of interest from an imager, the input pixel samples imaged in a first coordinate system; (b) forming a first function representing the input pixel samples, defined along a first axis in the first coordinate system; (c) forming an impulse response function (IPR) for use in resampling the input pixel samples into output pixel intensities, in which the output pixel intensities are defined along a second axis in a second coordinate system; (d) forming a derivative of the IPR, defined as a second function along the second axis; and (e) convolving the first function with the second function to determine the slope of output pixel intensities in the region of interest. The input pixel samples may be generated by the imager viewing a scene in an imager-centered coordinate system, defined as the first coordinate system; and the output pixel intensities may be generated for display by a user viewing the scene in an earth-centered coordinate system, defined as the second coordinate system.

The first function may be defined as f(x), and the second function may be defined as g'(x). Convolving may be defined by the following equation:

$$f(x) \otimes g'(x).$$

The slope of the output pixel intensities may define an edge in the region of interest of the image.

Yet another embodiment of the present invention includes a system for resampling and calculating slope in an image. The system includes: an imager for viewing a region of interest in a scene and obtaining input pixel samples in a first coordinate system, and a display for viewing the scene in a second coordinate system. A processor is also included for (a) resampling the input pixel samples into output pixel intensities in the second coordinate system, and (b) calculating the slope of the output pixel intensities in the second coordinate system. The processor is configured to (a) resample from the first to the second coordinate system and (b) calculate the slope of the output pixel intensities using a single operation.

The single operation is expressed by the following equation:

$$s'(x) = r'(x) \otimes h(x) \otimes u(x)$$

where s(x) is the output pixel intensities in the region of interest,
s'(x) is the slope of the output pixel intensities in the region of interest,
h(x) is an impulse response of the imaging device,
u(x) is scene intensity,
r(x) is the resampler IPR,
r'(x) is the derivative of the resampler IPR.

The imager may be disposed in an airborne platform, and the scene may include a geographic location on the Earth.

It is understood that the foregoing general description and the following detailed description are exemplary, but are not restrictive, of the invention.

BRIEF DESCRIPTION OF THE FIGURES

The present invention may be understood from the following detailed description when read in connection with the accompanying figures:

FIG. 1 shows an example of resampling using convolution.

FIG. 3 shows a flow diagram of a method of resampling input pixels plotted along a first axis into output pixel intensities plotted along a second axis.

DETAILED DESCRIPTION OF THE INVENTION

Figure 2A:
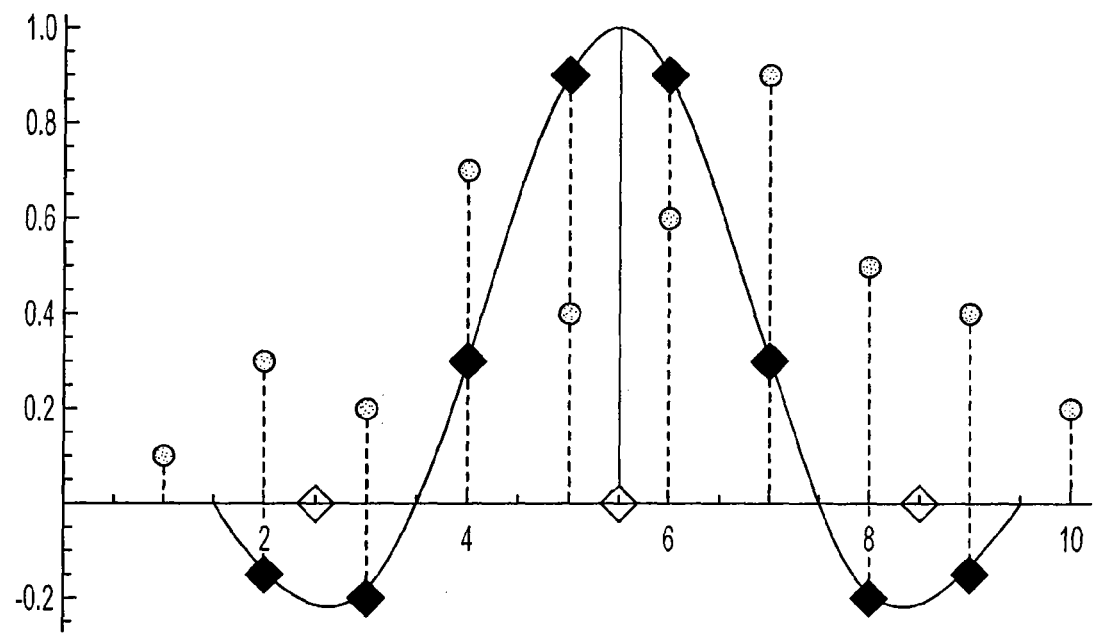
FIG. 2A shows an example of downsampling by a factor of 2 relative to the resampling example shown in FIG. 1, in which the impulse response function is a sin X/X function.

The present invention accurately calculates the derivative (slope) of a resampled image by combining resampling and differentiation into a single operation. By combining these operations, it is possible to obtain a more accurate value of the derivative than provided by calculating a discrete derivative of the resampled image. In addition, the present invention, prevents degradation in image quality which is inherent in discrete derivative calculations, and reduces the number of computations needed to obtain a desired result.

It will be appreciated that conventionally a discrete derivative of pixel intensities in an image is calculated by subtracting values of adjacent pixels, which effectively provides approximations of the derivative at points midway between pairs of pixels. A discrete derivative may also be calculated by subtracting values of non-adjacent pixels, resulting in even poorer approximations.

The present inventor realized that the discrete derivative introduces a systematic degradation of image quality at edges of objects in an image. For example, consider an imaging system characterized by a spatial response function $h_{sys}(x)$, which views an edge in a scene u(x), to produce the following signal:

$$S_n = \int_{-\infty}^{\infty} h_{sys}(x) u(x+x_n) dx \qquad (1)$$

Then the discrete derivative of the signal is:

$$S_n - S_{n-1} = \int_{-\infty}^{\infty} h_{sys}(x) u(x+x_n) dx - \qquad (2)$$
$$\int_{-\infty}^{\infty} h_{sys}(x) u(x+x_{n-1}) dx \int_{-\infty}^{\infty} h_{sys}(x) [u(x+x_n) - u(x+x_{n-1})] dx =$$
$$\int_{-\infty}^{\infty} h_{sys}(x) \text{rect}\left[\frac{x - \frac{(x_n + x_{n-1})}{2}}{x_n - x_{n-1}}\right] dx$$

It will be appreciated that a discrete derivative is a convolution of $h_{sys}(x)$ with the derivative of an edge. Ideally, the derivative of an edge is a delta function. Instead of getting a delta function, however, Equation (2) is a convolution of $h_{sys}(x)$ with a rectangular (rect) function that is as wide as the distance between the two pixels of $(x_n - x_{n-1})$. Effectively, the edge derivative in Equation (2) is now a rectangular function instead of a delta function.

The above is mathematically equivalent to convolving a true edge derivative (a delta function) with a rectangular function, since the convolution of a delta function with any function $f$ returns that function $f$. Therefore, the above equation may be interpreted as follows: The discrete derivative introduces a degradation in the data equivalent to convolving the underlying scene intensity with a rectangular function having a width equal to the pixel spacing. In the limit, of course, as the distance between pixels becomes very small, the rectangular function does become a delta function. But for many applications, the distance between pixels is not small enough to prevent image degradation. Image degradation also translates into an error in the value of the derivative.

Discrete derivatives also have another shortcoming. They may only be calculated at locations midway between pixels. The discrete derivative may be calculated at a pixel location by taking the differences between the pixels on either side of the pixel of interest, but this introduces a convolution with a wider rectangular function and a produces a larger error in the value of the derivative. In addition, there are applications in which images are remapped from a collection grid to a more desirable output grid, making it also desirable calculate derivatives at arbitrary locations between pixels.

It will be appreciated that a discrete derivative may be made more accurate by interpolating the data at a high resolution and then calculating adjacent sample differences. However, this significantly increases the computational load on the processing system. In addition, interpolation introduces image quality degradation and subsequent error.

The present invention advantageously does not require calculating discrete derivatives. The present invention advantageously accounts for the fact that images are often collected in one grid and resampled to another more desirable grid. In addition, convolution is used by the present invention to calculate very accurate values of derivatives of scene intensities at arbitrary pixel locations. How this is accomplished is further developed below.

Resampling may be expressed as a convolution of a resampler impulse response function (IPR) with data points that are being resampled, in which the convolution lags are selected at the output grid locations.

The derivative of a convolution is given by two equivalent expressions, as follows:

$$\frac{d}{dx}[f(x) \otimes g(x)] = f(x) \otimes g'(x) = f'(x) \otimes g(x) \quad (3)$$

Therefore, the convolution of a resampler IPR with the derivative of scene intensity is equal to the convolution of a derivative of the resampler IPR with the scene intensity. By selecting a resampler IPR that has an analytic expression, the present invention calculates an exact derivative of the resampler. If an analytic expression is not available, the derivative could be calculated from closely-spaced (i.e. much smaller than the pixel spacing) samples of the resampler IPR. Convolving this derivative with the collected image produces a highly accurate derivative of the resampled image, and prevents image quality degradation that may result from a discrete derivative, such as Equation (2). In addition, once the derivative function of the resampler IPR is found, the present invention may center the derivative function at any desired location prior to calculating the convolution in Equation (3).

In order to understand the present invention, resampling must first be understood. Therefore, resampling is explained below.

Typically, resampling maps data from one uniform grid to another uniform grid. As an example, it is often desirable to take repeated images of the Earth such that each image pixel is located at the exact same location on the Earth's surface. However, it is not possible to collect multiple images from the same exact location and with the same exact pointing angle. Resampling solves this problem by interpolating data samples from the original collection grid (which changes from image to image) to an output grid that is fixed with respect to the Earth's surface.

Resampling may be accomplished by convolving samples of a resampler impulse response function (IPR) with the input signal samples. A procedure for resampling is shown in the following equation, which includes a convolution. The $m^{th}$ resampled signal sample is as follows:

$$s(\alpha_d, \phi_d, m, \alpha_r, \phi_r) = \sum_{n=-\infty}^{\infty} g(n\alpha_d + \phi_d) h_r(n\alpha_d + \phi_d - m\alpha_r - \phi_r) \quad (4)$$

where $\alpha$ denotes sample intervals,
$\phi$ denotes phasing,
d denotes input grid parameters,
r denotes resampled grid parameters,
$g(\alpha)$ denotes the input data, and
$h_r(\alpha)$ denotes the resampler impulse response function (IPR).

The above equation is a discrete sum that may be calculated so long as either $g(\alpha)$ or $h_r(\alpha)$ has a finite extent. The resampler IPR usually has a small finite size (e.g. 3 to 5), which permits exact calculation of the resampled data values.

It will be appreciated that the argument of the resampler function, namely, $n\alpha_d + \phi_d - m\alpha_r - \phi_r$, is the distance between the input grid locations and the output grid locations. Thus, the resampled signal value at a given location may be obtained by the following steps:

(1) centering the resampler IPR on the output grid location,
(2) sampling the resampler IPR at the input grid locations,
(3) multiplying each IPR sample by the corresponding input sample, and
(4) summing over the resulting samples.

This process is illustrated in FIG. 1. As shown, the input signal (represented by dots) is to be resampled to the output grid, which is represented by hollow diamonds. The resampler IPR is shown centered on one of the output grid locations, namely, location 5. The IPR is then sampled at the input grid locations (shown as solid diamonds). It will be appreciated that the IPR samples are the weights by which the input samples are multiplied. The resampled (output) value is the weighted sum of the four input samples (in this example) near the output grid location.

Figure 2B:
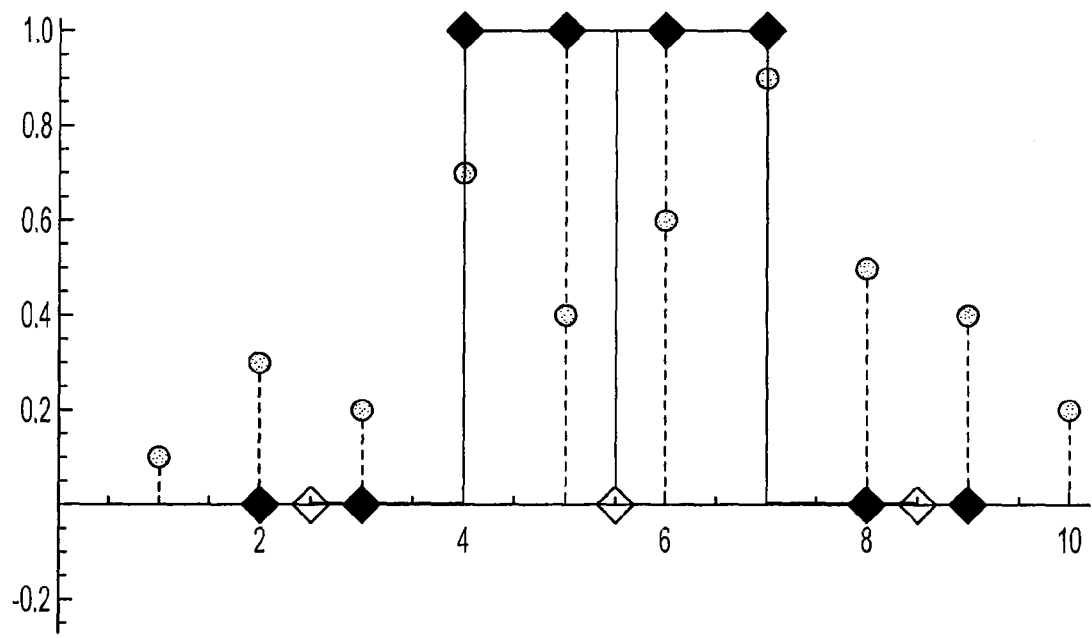
FIG. 2B shows an example of downsampling by a factor of 2 relative to the resampling example shown in FIG. 1, except that the impulse response function is a rectangular function.

Generalized downsampling is illustrated in FIG. 2A, which differs from resampling by the increased width of the IPR (in order to mitigate aliasing) and the increased spacing of the output samples. FIG. 2A shows an example of downsampling by a factor of a relative to the resampling example shown in FIG. 1. A common form of downsampling is known as aggregation, in which input samples are simply summed together. Such aggregation is illustrated in FIG. 2B as a special case of downsampling, where the IPR is altered to have values of only 1 or 0. FIG. 2B shows an example of downsampling by a factor of 2, but using aggregation. In FIGS. 2A and 2B, the sampled input signal is presented by dots. The output grid is denoted by hollow diamonds. The input grid locations, in which the IPR is sampled, is presented as solid diamonds. The curve of the resampler IPR is shown centered on one of the output grid locations.

Imaging systems collect pixels on a collection grid that has approximately uniform angular spacing in the instrument's coordinate system. In many applications it is desirable to map these pixels to a uniform geo-centric angular grid, such as latitude-longitude. The function that maps the collection sample grid to the Earth's surface is nonlinear. Accordingly, a uniform grid on the Earth's surface maps to a non-uniform grid in the instrument's coordinate system, and a uniform grid in the instrument's coordinate system maps to a non-uniform grid on the Earth's surface.

For more detail on sampling from one grid to another grid, in which one grid is uniform and the other grid is non-uniform, reference is now made to U.S. application Ser. No. 13/427,051 filed on Mar. 22, 2012, which is incorporated herein by reference in its entirety.

Having described resampling, the manner in which the present invention calculates a derivative of a resampled image will now be explained.

Resampling an image produces data in the following form:

$$s(x)=r(x) \otimes h(x) \otimes u(x) \quad (5)$$

where
S(x) is the resampled image,
h(x) is the impulse response of the instrument that collects the image,
u(x) is the scene intensity, and
r(x) is the impulse response of the resampler.
The derivative of this image is as follows:

$$s'(x)=r(x) \otimes h(x) \otimes u'(x) \quad (6)$$

which, using Eq. (3), may be written as follows:

$$s'(x)=r'(x) \otimes h(x) \otimes u(x) \quad (7)$$

It will be appreciated that equations (5) and (7) are functionally equivalent. Since Eq. (5) represents resampling the collected image using the function r(x), Eq. (7) must represent a resampling of the collected image using the function r'(x). Therefore, the derivative of a resampled image may be calculated in a single step by resampling the image with the derivative of the resampler IPR.

Just as an input image may be resampled to an arbitrary output grid by centering r(x) on a desired output location, the derivative of the resampled image may be calculated at an arbitrary output grid by centering r'(x) on the desired output location.

Thus, the present invention has combined two operations (resampling and differentiation) into one operation, thereby reducing computational load of a processing system when using a method of the present invention.

The present invention may be used by an image processing system, in which it is desired to calculate a derivative of resampled images containing sharp edges. For example, the present invention may be used when calculating a modulation transfer function (MTF) of an imaging system from images of a knife-edge target, or determining the relative positions of detectors in an array from images of the knife-edge target.

Many image processing algorithms include edge-finding algorithms. Some examples are finding coastlines in imagery for image navigation and registration; finding geographic features for generating maps; finding edges in images for matching object shapes, or segmenting an image into regions containing different materials. Another example is image sharpening algorithms which add an edge image to the original image in order to enhance image quality.

Referring now to FIG. 3, there is shown method 30 for resampling pixels from one coordinate system into another coordinate system. As shown, method 30 receives the input pixel samples from a first coordinate system and, in step 31, plots the input pixel samples along a first axis having an input grid. The method then selects a resolution for the output pixels, or output intensity values. It may plot an output grid in a second axis, based on the selected resolution, using step 32. Once the first and second axes have been determined, step 33 aligns the two axes with respect to a common axis. The two axes, namely an input axis and an output axis, are shown in FIG. 1.

Step 34 then forms an impulse response function (IPR) for use in resampling the input pixel samples plotted along the first axis into output pixel intensities which will be plotted along the second axis. The IPR, as an example, is shown in FIG. 1, as the (sin X)/X function.

Step 35 plots the output pixel intensities along the second axis. It will be appreciated that the output pixel intensities are formed by the convolution process described with respect to Equation 4. Once the output pixel intensities are formed, step 36 is effective in providing the output pixel intensities to an end user. It will be understood that the output pixel intensities may first be stored in a storage device and then provided to a display for viewing by the end user.

Figure 4:
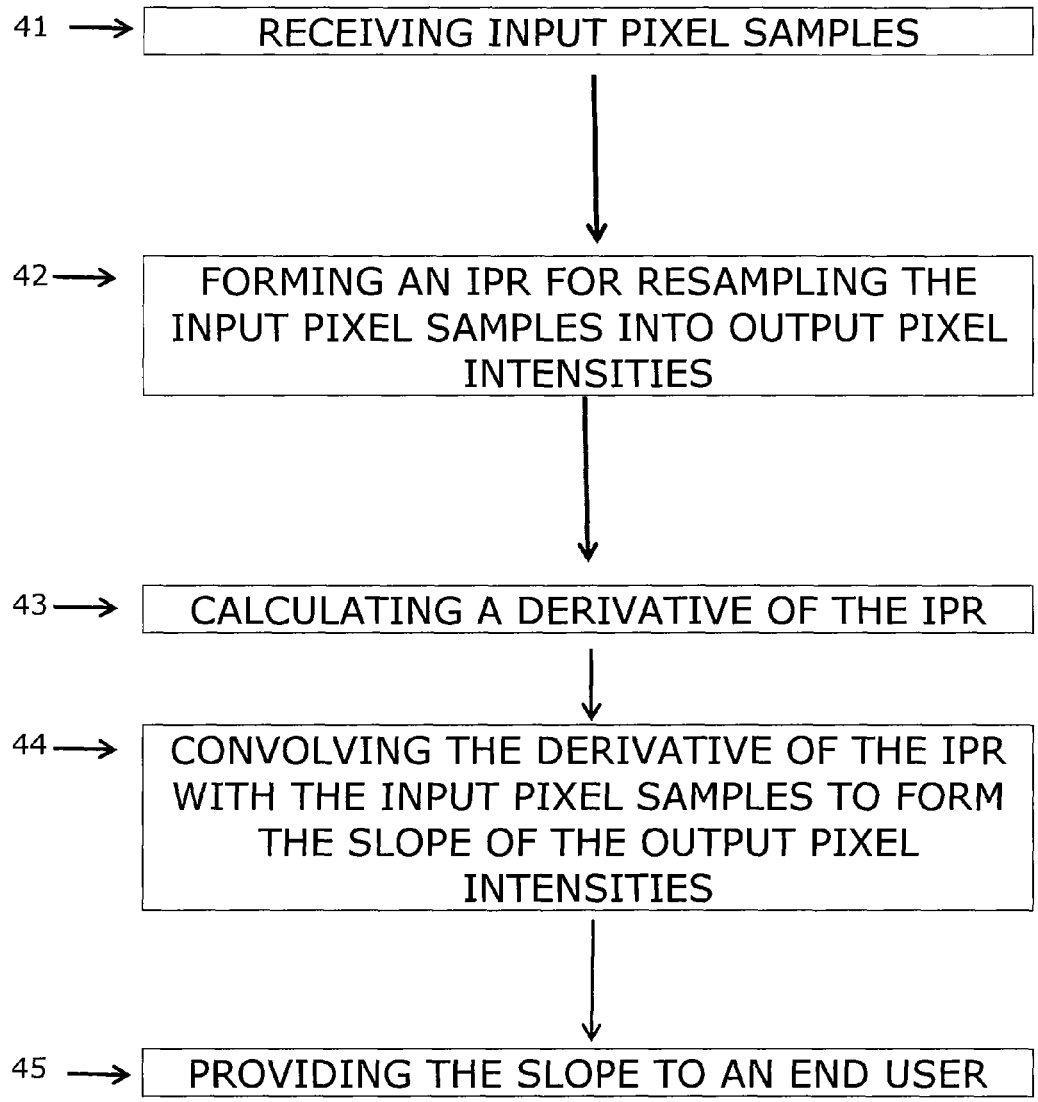
FIG. 4 shows a flow diagram of a method of calculating the slope of output pixel intensities by convolving the derivative of an impulse response function with input pixel samples, in accordance with an embodiment of the present invention.

Referring next to FIG. 4, there is shown method 40 as one embodiment of the present invention. In general, method 40 determines a slope (or a derivative) of a group of pixel intensities of an image. As shown in FIG. 4, input pixel samples are received from an imager by step 41. Step 42 forms an IPR which is used for resampling the input pixel samples in one coordinate system to output intensities in a different coordinate system. It will be understood that the IPR formed by step 42, for example, may be similar to the IPR formed by step 34 in FIG. 3.

Next method 40, by way of step 43, calculates the derivative of the IPR. Step 44 then convolves the derivative of the IPR with the input pixel samples to form a slope of the output pixel intensities. Once the slope, or derivative is obtained, step 45 provides the slope to an end user.

Figure 5:
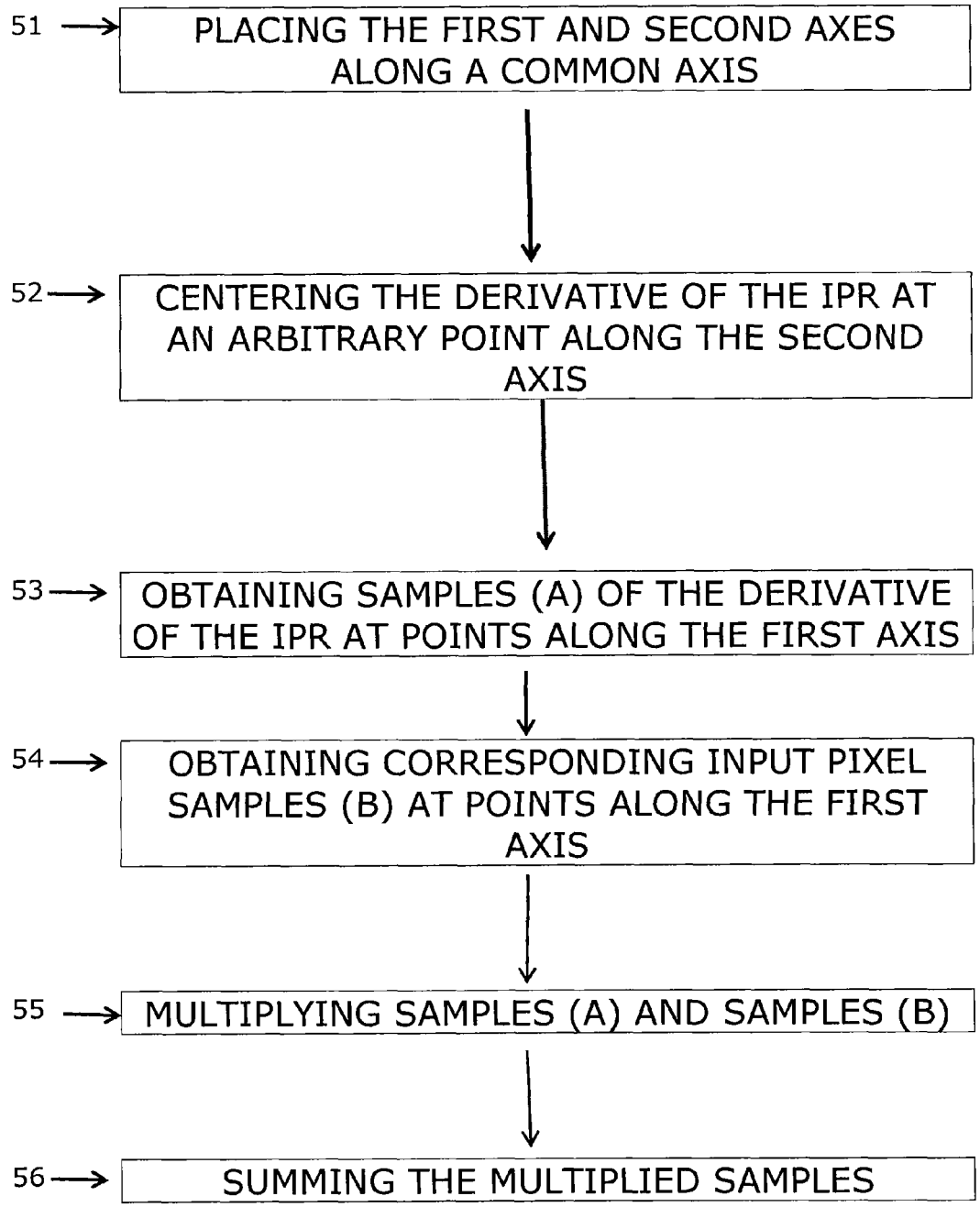
FIG. 5 shows a more detailed flow diagram of the convolution step performed by the method shown in FIG. 4, in accordance with an embodiment of the present invention.

More detail of the convolving step 44 will now be described with respect to FIG. 5. As shown, convolving step 44 includes several steps that may be best understood using the axes shown in FIG. 1. First, step 51 places the first and second axes along a common axis. Step 52 then centers the derivative of the IPR at the desired output grid location, which corresponds to the point at which the image derivative is desired. For example, FIG. 1 shows the IPR centered about the output axis, at point 5.

Step 53 obtains samples (shown as samples (A)) of the derivative of the IPR at points along the first axis. Step 54 obtains corresponding input pixel samples (shown as samples (B)) at points along the first axis. Step 55 then multiplies the points of samples (A) with the points in samples (B). Finally, step 56 sums the multiplied samples from step 55.

Figure 6:
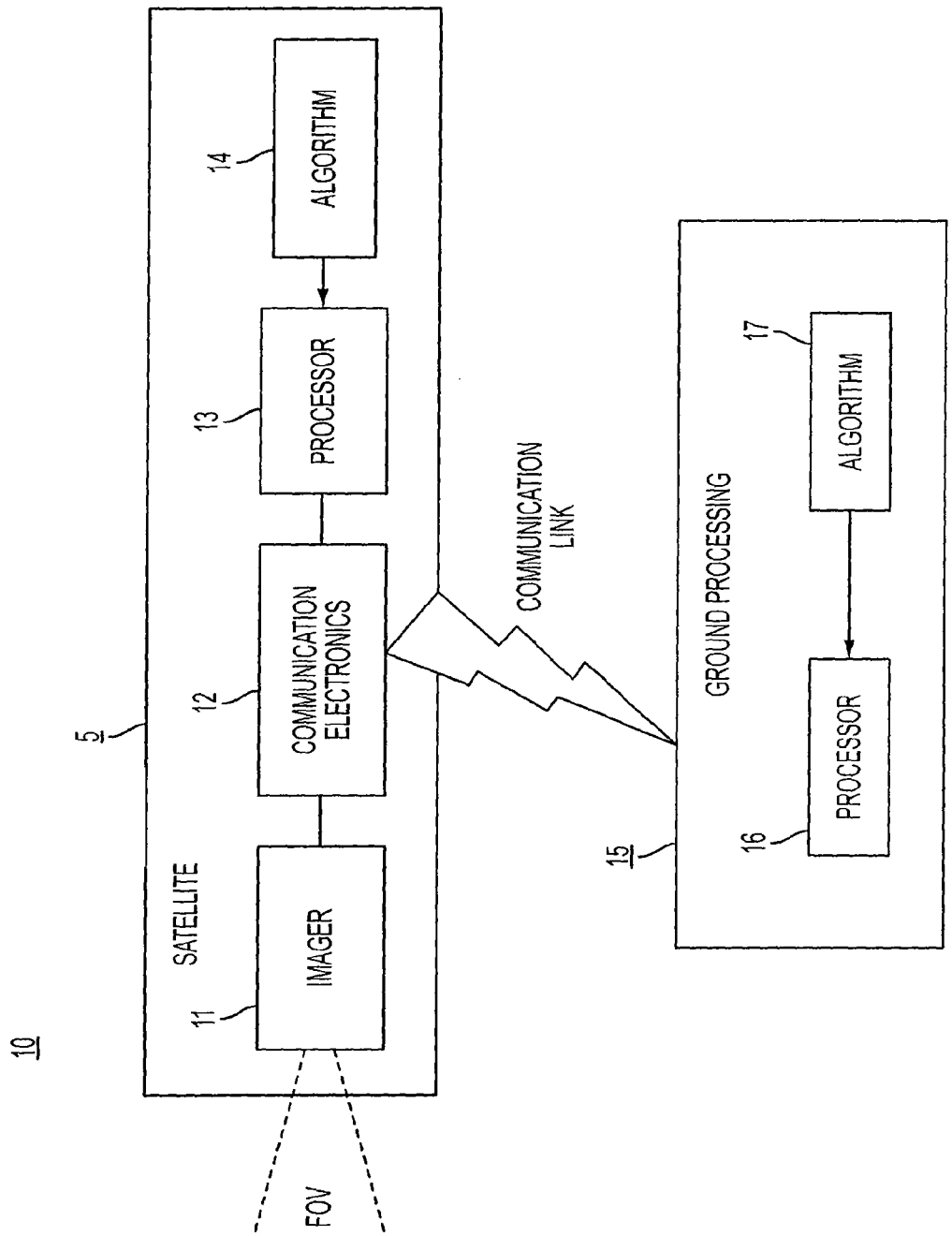
FIG. 6 is a block diagram of an image mapping system including algorithms of the present invention.

Referring now to FIG. 6, there is shown an image mapping system, generally designated as 10, which may employ the resampling of the present invention. As shown, image mapping system 10 includes satellite 5 and ground processing station 15.

Satellite 5 is imaging the Earth, as an example. Satellite 5 includes imager 11, communication electronic module 12 and processor 13. The processor is shown executing algorithm 14. The imager may have an array of pixels for imaging the Earth at a predetermined field-of-view. The module 12 may amplify and digitize the image to form input data which may be sampled onto a first grid spacing or a first axis. The sampled data may be stored in the satellite, or transmitted down to ground processing station 15 and stored therein. Electronic module 12 may also include the communications, command and control required for downlinking the detected input data to ground processing station 15. Algorithm 14 is an algorithm providing the resampling of the present invention.

The algorithm may be executed by processor 13. The algorithm 14 also provides the slope of pixel intensities in a region-of-interest of the image.

Ground processing station 15 includes processor 16 which executes algorithm 17. Algorithm 17 may include the same resampling and slope determination methods as those included in algorithm 14. Alternatively, the resampling and slope determination of the present invention may be installed either in satellite 5 or in ground processing station 15.

In another embodiment, the present invention is used to determine the slope of a knife-edge target appearing in an image. This is done to estimate an optical transfer function (OTF) of an optical system. The knife-edge target image is tilted with respect to a focal plane array of the sensor, such that the target includes edges which cross different detector elements at different phases. The target is imaged onto the focal plane array, and the resulting edge-response data is turned into line-response data using the present invention. The OTF is then estimated directly from this line-response data.

Figure 7:
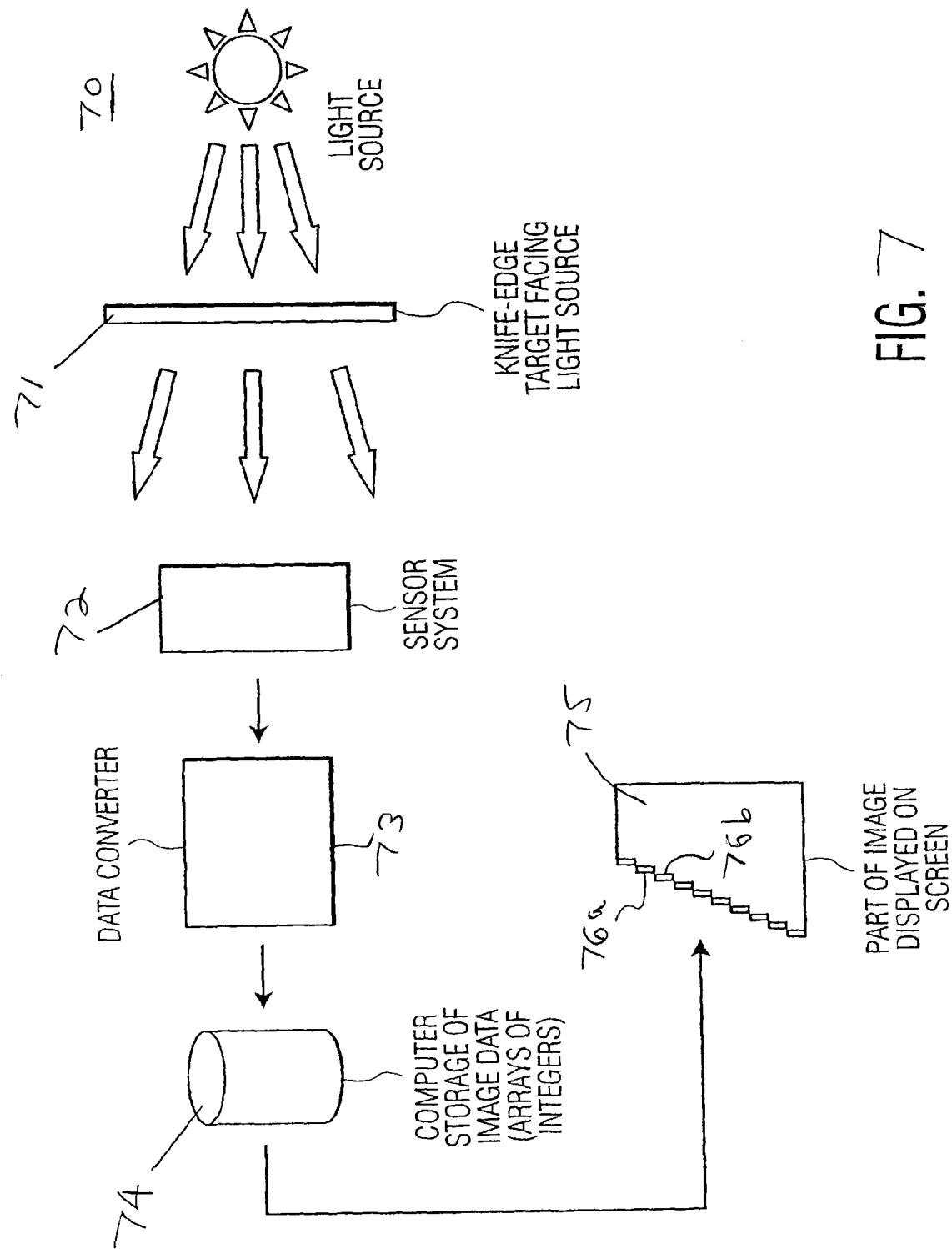
FIG. 7 is a block diagram of a system for obtaining knife-edge data.

Referring to FIG. 7, there is shown a system for obtaining knife-edge data, the system generally designated as 70. As shown, a knife-edge target 71 is imaged by sensor system 72, which may include any sensor that captures an image. The knife-edge target image 75 is tilted with respect to a focal plane array of the sensor, such that the target includes edges 76a and 76b. The output of the sensor system is provided to a data converter module 73. The data converter module may be any module that converts captured sensor data, which are typically analog data, into digital data. The data converter module may also convert the sensor data into an array of integers, which represent the sensed knife-edge target. The converted image data may be stored in a computer storage device as an array of integers, or may be displayed on a screen as image 75.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of determining slope of pixel intensities in an image, comprising the steps of:
    receiving, from an imaging device, input pixel samples of a region of interest;
    resampling the received input pixel sample into output pixel intensities using an impulse response function (IPR);
    calculating a derivative of the IPR; and
    convolving the derivative of the IPR with the input pixel samples to determine the slope of the output pixel intensities in the region of interest wherein the step of convolving is defined by the following equation:

$s'(x)=r'(x) \otimes h(x) \otimes u(x)$ where:
    s(x) is the output pixel intensities in the region of interest,
    s'(x) is the slope of the output pixel intensities in the region of interest,
    h(x) is an impulse response of the imaging device,
    u(x) is scene intensity, r(x) is the IPR, r'(x) is the derivative of the IPR.

2. The method of claim 1 wherein the input pixel samples are generated in a first coordinate system by the imaging device, and the output pixel intensities are generated in a second coordinate system.

3. The method of claim 1 wherein the input pixel samples are formed along a first axis in a first coordinate system, and the output pixel intensities are formed along a second axis in a second coordinate system; and
    the step of convolving includes the following sub-steps:
        placing the first axis and the second axis along a common axis;
        centering the derivative of the IPR at a point along the second axis;
        obtaining samples of the derivative of the IPR at points along the first axis;
        multiplying each sample of the derivative of the IPR by a corresponding input pixel sample at corresponding points along the first axis; and
        summing results of the multiplying step.

4. The method of claim 1 wherein the imaging device includes
    at least one of a night vision infrared camera,
    a visible camera, or an ultraviolet camera, and
    the method includes the step of:
        providing the output pixel intensities to at least one of a display or a storage device.

5. The method of claim 1 wherein the region of interest is an edge in the image.

6. The method of claim 5 wherein the edge includes at least one of a geographic feature, a pattern in a database of patterns, or a segment of an image.

7. The method of claim 1 wherein the region of interest is a knife-edge target in the image, and the knife-edge target is used for calculating an optical transfer function (OTF) of the image.

8. A method of determining slope of a region of interest in an image, the method comprising the steps of:
    receiving input pixel samples of the region of interest from an imager, the input pixel samples imaged in a first coordinate system;
    forming a first function representing the input pixel samples, defined along a first axis in the first coordinate system;
    resampling the input pixel samples into output pixel intensities using an impulse response function (IPR) in which the output pixel intensities are defined along a second axis in a second coordinate system;
    calculating a derivative of the IPR, defined as a second function along the second axis; and
    convolving the first function with the second function to determine the slope of output pixel intensities in the region of interest, wherein
    the first function is defined as f(x), and
    the second function is defined as g'(x), and
    the convolving is defined by the following equation:

$f(x) \times g'(x).$

9. The method of claim 8 wherein the input pixel samples are generated by the imager viewing a scene in an imager-centered coordinate system, defined as the first coordinate system; and
    the output pixel intensities are generated for display by a user viewing the scene in an earth-centered coordinate system, defined as the second coordinate system.

10. The method of claim 8 wherein convolving includes the sub-steps of:

placing the first axis and the second axis along a common axis;

centering the second function at a point along the second axis;

obtaining samples of the second function at points along the first axis;

multiplying each sample of the second function by a corresponding input pixel sample at corresponding points along the first axis; and summing results of the multiplying step.

11. The method of claim 8 wherein the slope of the output pixel intensities defines an edge in the region of interest of the image.

12. The method of claim 8 wherein the slope of the output pixel intensities in the region of interest defines a knife-edge target in the image.

13. A system of determining slope of pixel intensities in an image comprising:

an imager for viewing a region of interest in a scene and obtaining input pixel samples in a first coordinate system, a display for viewing the scene in a second coordinate system, and a processor configured to:

resample the input pixel samples into output pixel intensities in the second coordinate system using an impulse response function;

calculate a derivative of the impulse response function; and calculate the slope of the output pixel intensities in the second coordinate system by convolving the derivative of the impulse response function with the input pixel samples, wherein the single operation is expressed by the following equation:

$$s'(x) = r'(x) \otimes h(x) \otimes u(x)$$

where:

s(x) is the output pixel intensities in the region of interest, s'(x) is the slope of the output pixel intensities in the region of interest, h(x) is an impulse response of the imaging device, u(x) is scene intensity, r(x) is the impulse response function, r'(x) is the derivative of the impulse response function.

14. The system of claim 13 wherein the processor is further configured to resample the input pixels samples from the first coordinate system to the second coordinate system and calculate the slope of the output pixel intensities using a single operation.

15. The system of claim 13 wherein the imager is disposed in an airborne platform, and the scene includes a geographic location on the Earth.

16. The system of claim 15 wherein the first coordinate system is centered about the airborne platform; and the second coordinate system is centered about the Earth.

17. The system of claim 13, wherein the processor is further configured to: calculate an optical transfer function (OTF) of the image based on the determined slope of the output pixel intensities.

* * * * *